United States Patent [19]

Sigman, Jr.

[11] 4,173,920
[45] Nov. 13, 1979

[54] PLUNGE SHAVING MACHINE

[75] Inventor: John J. Sigman, Jr., Algonac, Mich.

[73] Assignee: Lear Siegler, Inc., Santa Monica, Calif.

[21] Appl. No.: 870,442

[22] Filed: Jan. 18, 1978

[51] Int. Cl.² .......................... B23F 19/06; B23C 9/00; F15B 15/22

[52] U.S. Cl. ........................................... 409/37; 92/9; 409/145

[58] Field of Search .................. 90/1.6 R, 21 R; 92/9; 91/2; 188/310, 314, 285, 289

[56] References Cited

U.S. PATENT DOCUMENTS

| | | | |
|---|---|---|---|
| 1,998,873 | 4/1935 | Kingsbury | 92/9 |
| 2,431,759 | 12/1947 | Larson | 92/9 X |
| 2,853,159 | 9/1959 | Kuhn, Jr. | 188/314 |
| 3,043,278 | 7/1962 | Ackerman | 91/2 X |
| 3,201,110 | 8/1965 | Taccone | 188/314 X |
| 3,213,754 | 10/1965 | Hurth et al. | 90/1.6 R |
| 3,929,057 | 12/1975 | Kondo | 92/9 |

*Primary Examiner*—Horace M. Culver
*Attorney, Agent, or Firm*—Whittemore, Hulbert & Belknap

[57] ABSTRACT

A gear shaving machine employing plunge cut (radial infeed with no lateral traverse) in which the rate of relative infeed between a meshed gear-like tool and a work gear is controlled by hydraulic escapement mechanism.

6 Claims, 7 Drawing Figures

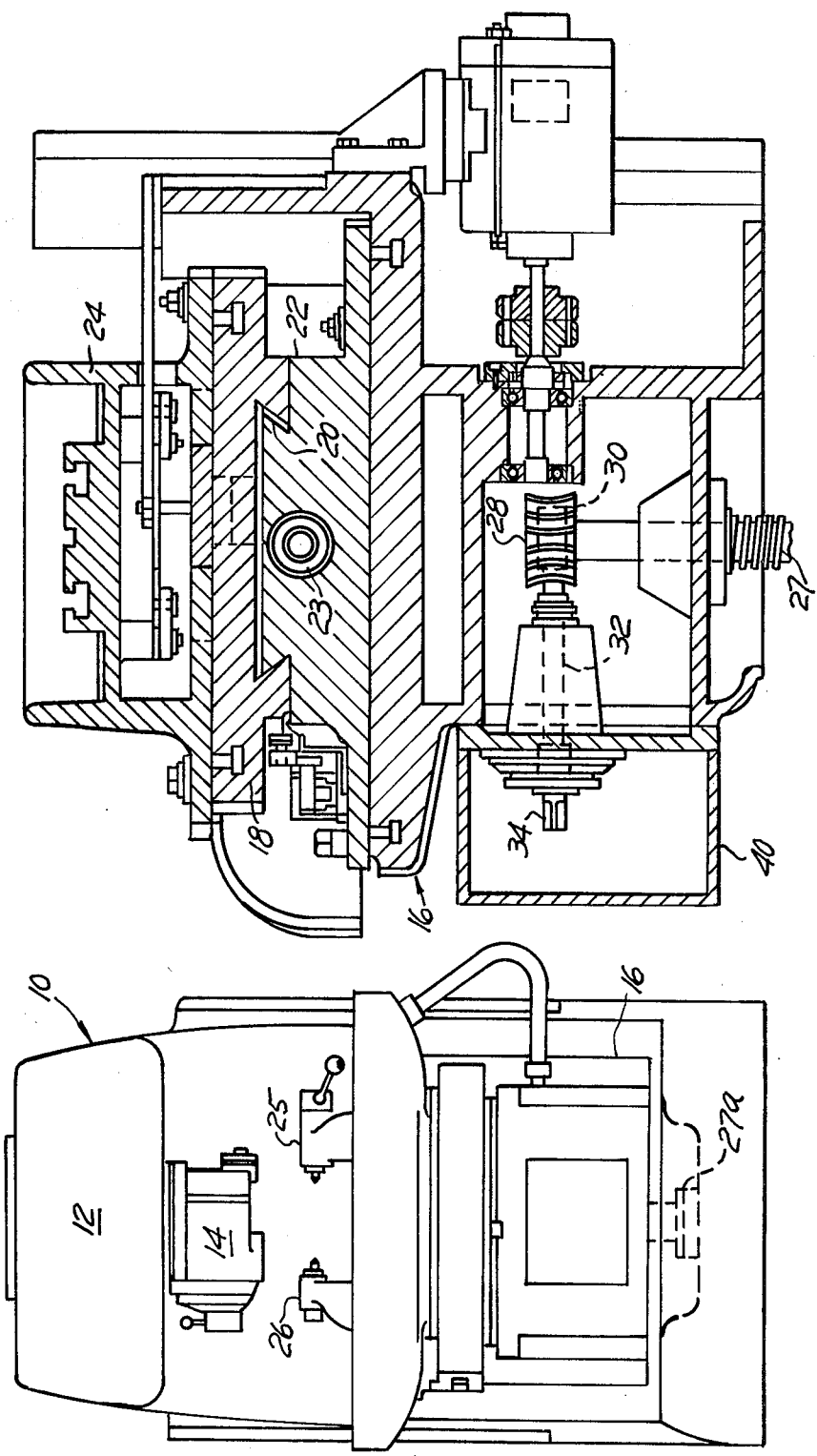

PLUNGE SHAVING MACHINE

BRIEF SUMMARY OF THE INVENTION

The shaving of cylindrical work gears, that is spur and helical, has long been known. As this operation was carried out in the past, a cylindrical work gear and a conjugate gear-like tool were rotated in mesh with the axes of the gear and tool crossed at a small angle. Where the angle at which the axes are crossed is substantial the contact between unmodified teeth of the gear and tool is limited to a small zone adjacent the common normal to the axes of the gear and the tool. In order to distribute the finishing action of the tool uniformly from end to end of the teeth, it was the practice to provide a relative lateral traverse between the gear and the tool. The direction of traverse occupied a plane parallel to the axes of both the gear and tool. At the end of a stroke of traverse, incremental infeed was provided, followed by a subsequent traverse stroke carried out at constant center distance.

More recently it has been proposed to finish shave gears in an operation in which the only relative movement, except for rotation between the gear and tool is a radial infeed. This eliminates the time required to carry out the lateral traverse and results in a very substantial reduction in the total time required to finish shave a gear.

This method of shaving is known as plunge shaving and is disclosed in Daniel U.S. Pat Nos. 3,293,987, 3,319,526, and 3,443,478, all assigned to the assignee herein. In addition to these prior patents the following U.S. patents have been granted to Carl Hurth, Maschinen-Und Zahnradfabrik: Hurth, et al, U.S. Pat. No. 3,213,754, Loos, U.S. Pat. No. 3,943,822.

In all of these prior patents, and in plunge shaving in general, as it is known today, the necessity for the time consuming traverse strokes is eliminated by providing a verysmall crossed axes angle and/or modifying the shaving cutter to have slightly concave or "enveloping" profiles as measured from end to end of the teeth.

The present invention relates to apparatus and method for shave cutting gears in a carefully controlled operation which is characterized in the use of a positive feeding device such as a threaded screw and a nut in combination with a non-positive actuator for the positive feed device, and a hydraulic escapement mechanism for controlling the rate of feed as provided by the positive feed device. This has the effect of providing substantially perfect control of a very slow continuous infeed, during which the relative rotation between the gear and tool removes material substantially from end to end of the gear teeth.

The control of the rate of relative rotation between the said screw and nut, where this is the positive feed device, comprises a lever or arm having a first abutment surface engageable with an abutment surface on a machine element positively movable with the movement of the said screw or nut, the lever or arm having a second abutment surface engageable with a movable abutment whose rate of movement is controlled by hydraulic escapement mechanism. With this arrangement feeding bias is continuously applied to the positive feed device, but the rate of its feeding operation is determined by the hydraulic escapement mechanism.

BRIEF DESCRIPTION OF THE DRAWINGS

FIG. 1 is a front elevation of a gear shaving machine incorporating the present invention.

FIG. 2 is a fragmentary enlarged vertical section showing the positive feed device.

DETAILED DESCRIPTION

Figure 3:
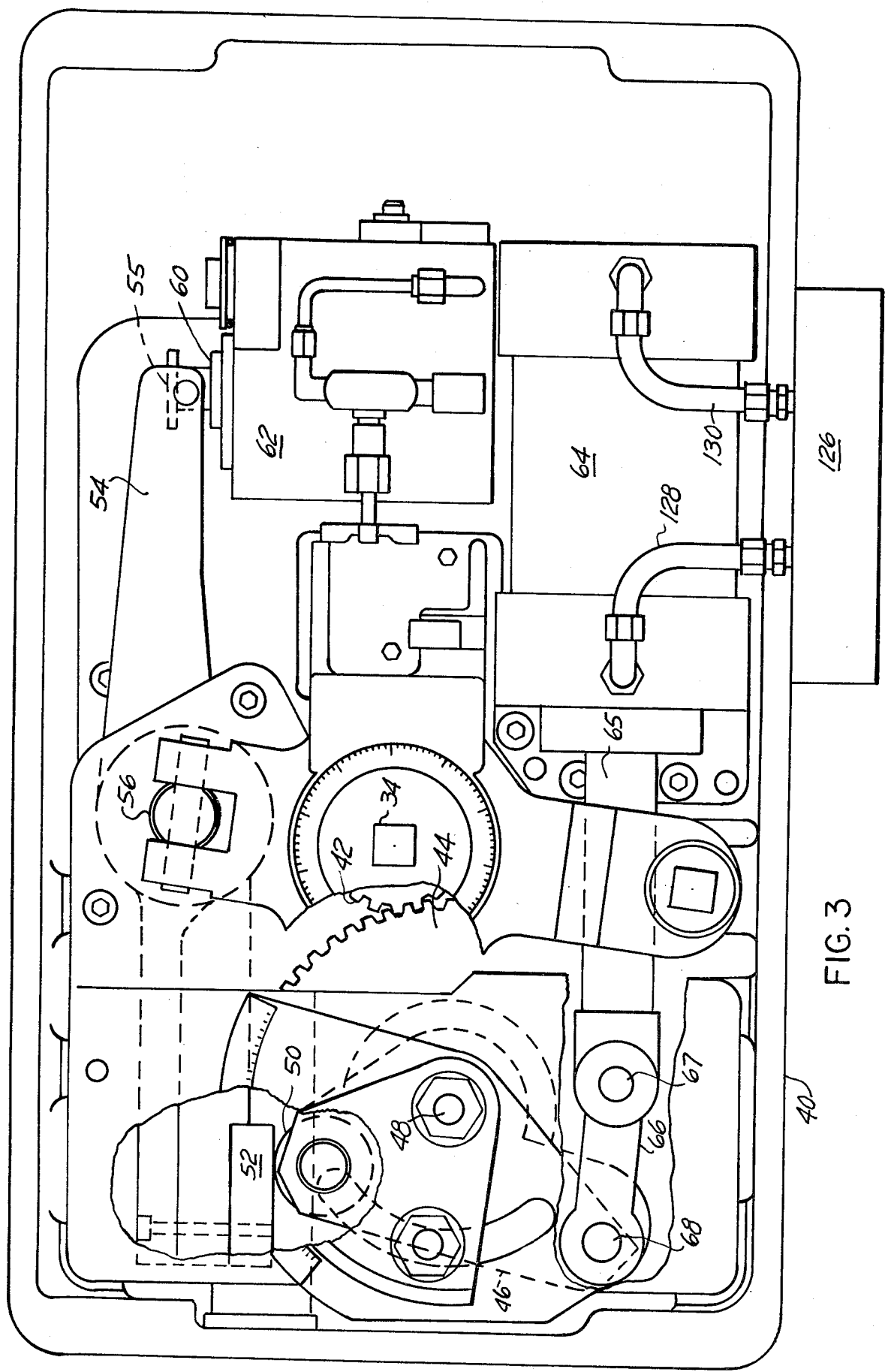
FIG. 3 is a further enlarged elevational view of the feed mechanism.
Figure 5:
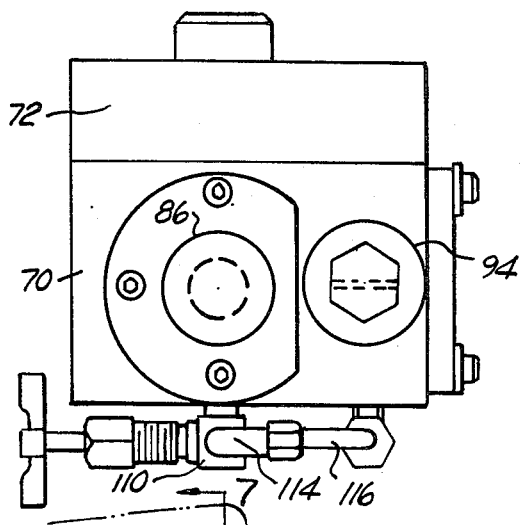
FIG. 5 is a top plan view of the mechanism of FIG. 4.
Figure 4:
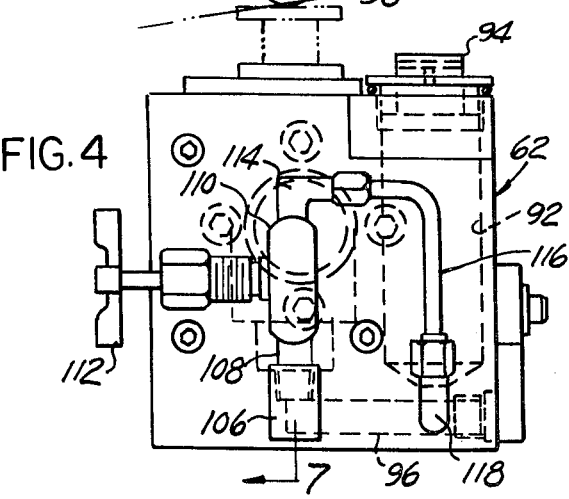
FIG. 4 is an elevational view of the hydraulic escapement mechanism.

Referring first to FIG. 1, the gear shaving machine comprises a main frame 10 having a forwardly projecting overhanging head 12 beneath which is suspended rotatable tool support 14. The tool support is driven by a motor within the head and is angularly adjustable about a vertical axis to determine the angularity between the axis of a gear-like cutting tool carried thereby and the axis of a work gear.

Mounted on the frame 10 is a vertically adjustable knee 16 which at its top carries a slide 18 mounted on ways indicated at 20 on a subslide 22. The slide 18 may be traverse on the ways 20 by a traverse screw indicated generally at 23, for carrying out conventional shaving operations as contrasted with the plunge feed operation of the present invention. It will be understood that this mechanism is provided so that the machine shown in FIGS. 1 and 2 can be converted to carry out either conventional (parallel or diagonal traverse) shaving or the plunge shaving of the present invention. The means for supporting the work gear comprises a table 24 which is angularly adjustable about a vertical axis with respect to the slide 18. On the table 24 are provided head and tail stocks 25 and 26 having rotatable centers therein for supporting a work gear for free rotation.

In employing the machine for plunge shaving the work and tool supports are relatively adjusted to provide for a predetermined relatively small angularity between the axes of the gear carried by the stocks 25 and 26 and the gear-like carried by the tool support 14.

The mechanism for effecting vertical movement of the knee, which in turn results in radial feed between the gear and gear-like tool, comprises feed screw mechanism including a feed screw 27 associated with a stationary nut 27a. The screw is rotatable for effecting vertical adjustment of the knee 16. Secured to the upper end of the vertical feed screw 27 is a worm gear 28 which meshes with a worm 30 carried by a shaft 32 terminating at the front of the machine in a square end 34, for rotation by a suitable hand tool.

It will be understood, of course, that the feed screw 27 and nut 27a comprises a positive feed device in which relative rotation between the feed screw and nut results in predetermined corresponding positive upfeed movement of the knee 16.

The present invention comprises a structure associated with the shaft 32 in such a way as to effect uniform controlled rotation thereof during a shaving cycle at a rate which produces infeed movement between the gear and tool at a correspondingly accurately controlled rate characterized particularly by the fact that the rate is smoothly and completely controlled throughout the feeding cycle.

The operation, which is ordinarily repeated automatically in a machine provided with automatic loading and unloading mechanism, involves infeed at a constant rate from an initial tight mesh condition to a full depth position in which the work gear is reduced to a precisely predetermined dimension and in which its tooth surfaces are machined so as to remove any imperfections which may have resulted from a rough machining operation. At full depth the gear and tool are rotated for a brief interval without further relative feed after which the gear and tool are separated to at least a loose mesh condition. The finished gear is then removed and a subsequent work gear loaded into the machine.

The feeding mechanism for carrying out these functions is illustrated in its entirety in FIG. 3, although details of the mechanism will be more apparent from FIGS. 4 through 7. The mechanism comprises a housing 40, and as seen in FIG. 2 the outer squared end 34 of the shaft 32 extends into this housing. Secured to the worm shaft 32 is a pinion 42. Carried by the housing 40 is a gear 44 which meshes with the pinion 42 and which is rigidly secured to an oscillating block or plate 46 mounted for rotary movement about a pivot member 48. Secured to the plate or block 46 is a roller 50 which is adapted to engage an abutment surface of a wear plate 52 secured to lever 54 which is mounted intermediate its ends on a pivot support 56. At its opposite end the lever 54 carries a roller 58 which engages an abutment surface 60 of hydraulic escapement mechanism shown in its entirety at 62.

A power unit in the form of an air cylinder 64 is provided including a piston therein and a piston rod 65 connected by a link 66 and pivot pins 67 and 68 to the oscillating plate 46. Actuation of the air cylinder 64 to move the piston to the left as seen in FIG. 3 tends to rock the plate clockwise thereby rotating gear 44 and hence small gear or pinion 42 which is rigidly secured directly to the work shaft 32. Rotation of the pinion 42 is determined by engagement between the roller 50 of the plate 46 and the wear plate 52 of the lever 54 and engagement between the roller 58 and abutment surface 60. Moreover, it will be recalled that the actual movement of the knee 16 is the result of operation of a feed screw and nut device which, of course, is positive and irreversible, and rotation of the device results in precisely controlled infeeding movement between the gear and tool. Also the operation of the cylinder 64 provides a non-positive biasing force which tends to rotate gear 44 and pinion 42 but the actual movement of plate 46 and hence of the gear and pinion, is determined by the roller 50 and abutment 52 and the roller 58 and abutment 60. The force supplied between gear 44 is sufficient to overcome cutting resistance between the tool and work gear and to produce the required rotation of the feed screw when permitted to do so by the abutments and rollers as previously described, so as to provide a smooth and continuous infeed.

The operation of the hydraulic escapement indicated generally at 62 will be apparent from a consideration of FIGS. 4 through 7, to which reference is now made.

Figure 6:
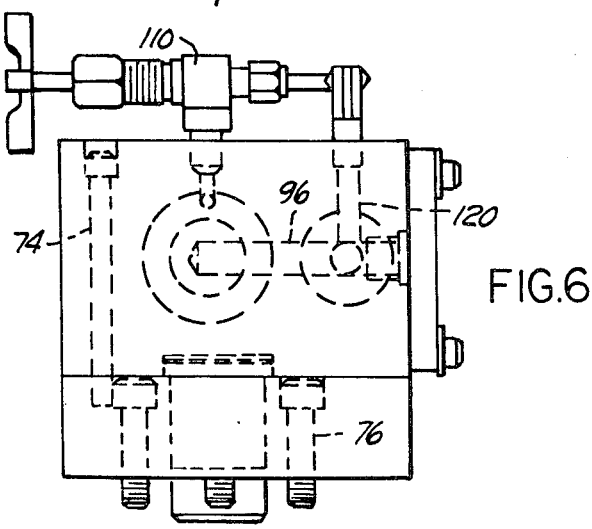
FIG. 6 is a bottom plan view of the mechanism of FIG. 4.

The hydraulic escapement mechanism 62 comprises a generally rectangular block 70 attached to a mounting plate 72 by screw 74 seen in FIG. 6. The plate 72 is mounted within the housing 40 by screws 76 and its position is determined by a locating dowel 77.

The block 70 is provided with an operating cylinder 78 extending inwardly of the block from the top thereof and providing at its inner end with a reduced portion 80 which in turn is provided at its lower end with a threaded chamber 82. Vertically movable in the cylinder 80 is a piston 84 having an abutment 86 secured thereto and extending through an opening 88 in a closure plate 90. The abutment 86 has a flanged head which provides the abutment 60 previously referred to, and the flange also constitutes a stop limiting downward movement of piston 84.

The block 70 is further provided with a cylindrical reservoir 92 having a removable top closure 94, a drilled passage 96 communication with the bottom of the reservoir 92 and with the bottom of the chamber 82.

Received in the chamber 82 is a check valve 98 which as shown has tapered and threaded end portions 100, the lower one of which is retained in the threads provided at the upper end of the chamber 82. The check valve is positioned so that it prevents flow of hydraulic fluid from the cylinder 78 but permits hydraulic fluid to flow from the reservoir 92 into the cylinder 78 below the piston 84 when the piston 84 is moved upwardly.

Figure 7:
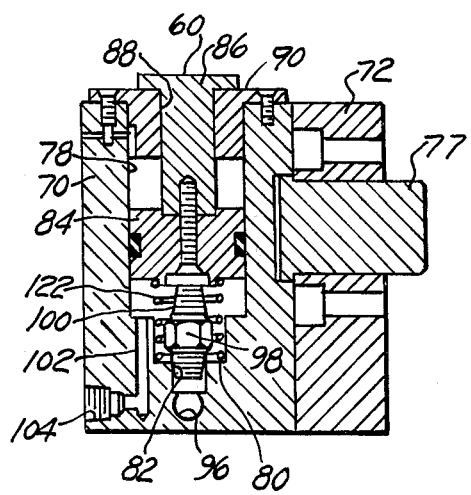
FIG. 7 is a sectional view on the line 7—7 of FIG. 4.

As best seen in FIG. 7 the lower end of the cylinder 78 is connected by passage means 102 to a tapped opening 104 which receives an elbow 106 having an arm 108 extending upwardly and connected to the bottom end of an adjustable metering or needle valve 110. Valve 110 is provided with a handle 112 by means of which the meter port of the valve may be accurately controlled to provide for escape of hydraulic fluid from the cylinder 78 under uniform pressure conditions which is at a precisely controlled uniform rate.

The upper end of the metering valve 110 is connected by an elbow 114, a conduit 116 and an elbow 118 to a passage 120 which communicates with the passage 96 as best seen in FIG. 6.

It will be apparent from the foregoing that downward movement of the roller 58 is permitted by the escape of hydraulic fluid from below the piston 84 in the cylinder 78 and this, of course, controls the precise rate at which the piston moves and the rate at which the gear 44 and pinion 42 are permitted to turn.

The reduced portion 80 of the cylinder 78 receives a compression spring 122 which moves the piston 84 upwardly following each machining operation when the forces applied by the piston within the power cylinder 64 are terminated at the end of a cycle.

The operation of the machine is best apparent from the foregoing but will be briefly reviewed. A work gear (not shown) is brought into the machine, preferably by automatically loading mechanism and is positioned in mesh with a gear-like cutter carried by the tool support 14. The tool support and work support are adjusted to provide a small crossed axes relationship sufficient to produce a cutting action of cutting edges provided on the teeth of the tool. The cutter is driven in rotation at substantial speeds and in turn rotates the work gear which is in mesh therewith.

Fluid under pressure is admitted to the cylinder 64 and this applies a non-positive continuous force to the plate or block 46 and hence to the gear 44. Rotation of the plate or block 46 causes the roller 50 to bear against the wear plate 52 on the lever 54 and this in turn applies a downward force to the roller 58 urging the piston 84 downwardly to the cylinder 78. The rate of downward movement of the piston 84 is controlled by the metering valve 110 which is adjusted to provide the required rate of downward movement of the piston and hence upward movement of the knee 16 and the work gear carried thereby. Upward movement of the work gear is continued until the flanged head of the abutment member 86 contacts the closure plate 90 which terminates the gear finishing cycle.

It will, of course, be understood that any other suitable means may be provided for adjusting the position at which movement of the lever or arm 54 is terminated, to determine the precise dimensions of the finished gear. This may for example take the form of means provided for adjustment of the abutment 86 and the piston 84, adjustment of the hydraulic escapement mechanism, or adjustable stop means associated with the lever or arm 54 or with the plate or block 46.

Suitable time and control means may be provided as indicated at 126 which controls the application and exhaust of hydraulic fluid to the cylinder 64 through the conduit indicated at 128 and 130. When pressure is admitted through the conduit 128 it moves the piston therein to the right, rotating plate 46 counterclockwise and permitting the spring 122 to move the piston 84 upwardly with accompanying movement of the lever 54. This replenishes hydraulic fluid beneath the piston 84 through the check valve 98 and prepares the machine for the next succeeding cycle.

What I claim my invention is:

1. A plunge-cut gear shaving machine in which a gear shaving cutter in the form of a gear-like tool member and a work gear member, are rotated in mesh and relatively fed radially to a predetermined full depth position at a controlled rate, maintained at full depth without lateral traverse for a predetermined dwell period, and then retracted, which comprises a frame, a rotary support on said frame for supporting a first one of said members, a slide on said frame, a second rotary support on said slide for supporting the other of said members in mesh with said first member, means for driving one of said supports in rotation, a feed device including threadedly engaged screw and nut elements, one of which is rotatable, connected between said frame and said slide to feed said slide upon rotation of said one rotatable element in a direction to cause a radial depth feed between said members, a feed gear fixed to said rotatable feed element, a driving gear in mesh with said feed gear, a piston and cylinder actuator connected to said driving gear, a lever pivoted intermediate its ends on said frame, a cam fixed to said driving gear, a cam follower at one end of said lever engaging said cam, abutment means limiting rotation of said lever and hence of said driving gear, said abutment means comprising a movable abutment engaged by the other end of said lever, and adjustable hydraulic escapement means controlling the rate of movement of said abutment to control the rate of depth feed between said members, said escapement means comprising a manually adjustable metering valve to predetermine the rate of infeed between said members.

2. A machine as defined in claim 1, in which said abutment means comprises a hydraulic cylinder, said movable abutment comprising a piston movable in said cylinder and having an abutment surface exterior of said cylinder engageable by the said other end of said lever, said adjustable metering valve controlling the rate of escape of hydraulic fluid from said cylinder.

3. A plunge-cut gear shaving machine in which a gear shaving cutter in the form of a gear-like tool member and a work gear member, are rotated in mesh and relatively fed radially to a predetermined full depth position, maintained at full depth without lateral traverse for a perdetermined dwell period, and then retracted, which comprises a frame, a rotary support on said frame for supporting a first one of said members, a slide on said frame, a second rotary support on said slide for supporting the other of said members in mesh with said first member, means for driving one of said supports in rotation, a feed screw and nut device including a rotatable feed member connected between said frame and said slide to feed said slide in a direction to cause a radial depth feed between said members, a feed gear fixed to said rotatable feed member, a driving gear in mesh with said feed gear, a non-positive actuator connected to said driving gear, movable abutment means limiting rotation of said drive gear, and adjustable escapement means controlling the rate of movement of said abutment means to control the rate of depth feed between said members, said escapement means comprising a block having a cylinder opening at one side thereof, a piston device movable in the cylinder and including an abutment surface, a reservoir formed in said block, a passage in said block connecting said cylinder and reservoir, a check valve connected to control flow from said reservoir to said cylinder within said piston, adjustable metering valve carried by said block, and passages connecting said metering valve to said cylinder within said piston and to said reservoir.

4. A machine as defined in claim 3, in which check valve is located within said cylinder.

5. A machine as defined in claim 4, in which said metering valve is mounted on the exterior of said block.

6. A machine as defined in claim 3, comprising a compression spring in said cylinder engaging the inner side of said piston to move said piston outwardly of said cylinder to replenish the hydraulic fluid therein from said reservoir.

* * * * *